US012580355B2

(12) United States Patent
Zhang et al.

(10) Patent No.: US 12,580,355 B2
(45) Date of Patent: Mar. 17, 2026

(54) ADAPTER CONNECTOR ASSEMBLY, ELECTRICAL CONNECTOR PLUG, AND ELECTRICAL CONNECTOR KIT

(71) Applicants: Phoenix Contact Asia-Pacific (Nanjing) Co., Ltd., Nanjing (CN); Phoenix Contact GmbH & Co. KG, Blomberg (DE)

(72) Inventors: Miao Zhang, Nanjing (CN); Wenjing Zhao, Nanjing (CN); Detlef Nehm, Schieder-Schwalenberg (DE); Hartmut Schwettmann, Rahden (DE)

(73) Assignees: Phoenix Contact Asia-Pacific (Nanjing) CO., LTD., Jiangsu (CN); Phoenix Contact GmbH & Co. KG, Blomberg (DE)

( * ) Notice: Subject to any disclaimer, the term of this patent is extended or adjusted under 35 U.S.C. 154(b) by 289 days.

(21) Appl. No.: 18/264,598

(22) PCT Filed: Feb. 8, 2022

(86) PCT No.: PCT/CN2022/075487

§ 371 (c)(1),
(2) Date: Aug. 8, 2023

(87) PCT Pub. No.: WO2022/166981

PCT Pub. Date: Aug. 11, 2022

(65) Prior Publication Data

US 2024/0128698 A1 Apr. 18, 2024

(30) Foreign Application Priority Data

Feb. 8, 2021 (CN) ........................ 202110172254.1

(51) Int. Cl.
*H01R 31/06* (2006.01)
*H01R 13/512* (2006.01)
*H01R 13/58* (2006.01)

(52) U.S. Cl.
CPC .......... *H01R 31/06* (2013.01); *H01R 13/512* (2013.01); *H01R 13/5812* (2013.01)

(58) Field of Classification Search
None
See application file for complete search history.

(56) References Cited

U.S. PATENT DOCUMENTS 6,315,600 B1 11/2001 Droesbeke
10,530,093 B2 1/2020 Schönfeld et al.
(Continued)

FOREIGN PATENT DOCUMENTS

CN 101589513 A 11/2009
CN 102832490 A * 12/2012 .......... H01R 13/518
(Continued)

OTHER PUBLICATIONS

Extended Search Report from counterpart European Application No. 22749260.0 dated Jan. 22, 2025, 8 pp.
(Continued)

*Primary Examiner* — Tho D Ta
(74) *Attorney, Agent, or Firm* — Shumaker & Sieffert, P.A.

(57) ABSTRACT

The present disclosure provides an adapter connector assembly, an electrical connector plug, and an electrical connector kit. One end of the adapter connector assembly is configured for adaptive installation of a cable entry system, and the adapter connector assembly includes a mounting frame and a housing that can be assembled together. An upper portion of the mounting frame is configured to be assembled with the cable entry system, and the housing has a first and second open ends opposite each other and a cavity extending between the first and second open ends and for accommodating at least part of the mounting frame. The adapter connector assembly provided herein enables the combined use of the cable entry system and a connector, and thus broadens a cable application scope of the connector and increases a service life of cables mounted to the connector.

12 Claims, 4 Drawing Sheets

(56) References Cited

U.S. PATENT DOCUMENTS

| | | | | |
|---|---|---|---|---|
| 10,535,960 | B2 * | 1/2020 | Meier | H01R 13/7032 |
| 10,714,237 | B1 * | 7/2020 | Hamner | H01R 24/56 |
| 2010/0006709 | A1 | 1/2010 | Bleus et al. | |
| 2011/0081800 | A1 | 4/2011 | Heise et al. | |
| 2012/0230646 | A1 | 9/2012 | Thompson et al. | |
| 2017/0012386 | A1 | 1/2017 | Tseng et al. | |
| 2018/0248298 | A1 | 8/2018 | Schönfeld et al. | |

FOREIGN PATENT DOCUMENTS

| | | | | |
|---|---|---|---|---|
| CN | 209016333 | U | 6/2019 | |
| CN | 110120609 | A | 8/2019 | |
| CN | 110651401 | A | 1/2020 | |
| CN | 212392437 | U | 1/2021 | |
| CN | 112952411 | A | 6/2021 | |
| CN | 214505796 | U | 10/2021 | |
| DE | 102015015189 | B3 * | 3/2017 | H01R 13/5812 |
| TW | 201703376 | A | 1/2017 | |

OTHER PUBLICATIONS

Office Action from counterpart Chinese Application No. 202110172254.1 dated Dec. 12, 2024, 7 pp.

International Search Report and Written Opinion of International Application No. PCT/CN2022/075487, dated Apr. 15, 2022, 13 Pages.

* cited by examiner

ADAPTER CONNECTOR ASSEMBLY, ELECTRICAL CONNECTOR PLUG, AND ELECTRICAL CONNECTOR KIT

This application is a national stage application under 35 U.S.C. § 371 of International Application No. PCT/CN2022/075487, filed Feb. 8, 2022, which claims priority of Chinese Patent Application No. 202110172254.1, filed Feb. 8, 2021. The entire contents of each of Application Nos. PCT/CN2022/075487 and CN 202110172254.1 are incorporated herein by reference.

TECHNICAL FIELD

The present disclosure relates to an adapter device and, in particular, to an adapter connector assembly for adaptive installation of a cable entry system.

BACKGROUND

In the field of electrical connections, heavy-duty connectors are widely used. Typical heavy-duty connectors allow for the pre-installation of cables, thereby reducing a wiring error rate and increasing the efficiency of electrical equipment installation.

Heavy-duty connectors are to be pre-installed with cables in a manner typically shown in FIG. 1, which illustrates a cross-sectional view of a heavy-duty connector 1 mounted with cables 10. As shown in FIG. 1, the heavy-duty connector 1 comprises a plug portion and a receptacle portion to be mated with each other. The plug portion comprises an upper shell 12, as well as fixed or modular inserts 11 disposed in the upper shell 12. The receptacle portion comprises a lower shell 15. The upper shell 12 of the plug portion is to be assembled with the lower shell 15 of the receptacle portion. In the process of installing the cables 10 into the plug portion of the heavy-duty connector 1, after the cables 10 are connected and secured to the inserts 11 of the heavy-duty connector 1, the cables 10 are required to be bent so that they can come out of a top opening of the upper shell 12, and a cable joint 13 screwed with the top opening is then used to sleeve the cables 10 at the top opening, so as to complete the pre-installation of the plug portion of the heavy-duty connector 1 and the cables 10. It can be seen that in the process of pre-installing the cables 10 with the heavy-duty connector 1, a plurality of cables 10 must be bent and aggregated together so that these cables 10 can come out of the top opening of the upper shell 12 and be sleeved by the cable joint 13. This approach will make the heavy-duty connector unavailable for thicker cables and cables that cannot be bent due to other reasons. In addition, because the cables 10 being bent for a long period of time are susceptible to damage, such installation of the heavy-duty connector and cables will eventually increase the maintenance cost of electrical devices and affect the use of electrical devices. A similar problem exists in other heavy-duty connector models where a cable exit location is not at the top of the upper shell but on the side.

In addition, for cable installation, a Cable Entry System (CES) has presently been developed, to replace the cable joint which is on electrical cabinet or electrical device and being used to sleeve the cables, and to introduce the cables into an electrical cabinet or electrical device. Typically, such CES product needs to be mounted onto a panel.

SUMMARY

The proposed technical solution of the present disclosure is intended to solve the above-described problems, i.e. unbendable cables cannot be used with heavy-duty connectors, and cables installed into heavy-duty connectors are easy to be damaged.

The present disclosure provides an adapter connector assembly that makes it possible that a cable entry system is used in conjunction with a connector.

In one aspect of the present disclosure, an adapter connector assembly is provided, wherein one end of the adapter connector assembly is configured for adaptive installation of a cable entry system, the adapter connector assembly comprises: a mounting frame, an upper portion of the mounting frame configured to be assembled with the cable entry system; and a housing having a first opening end and a second opening end opposite to each other and a cavity extending between the first and second opening ends, the cavity being configured to accommodate at least part of the mounting frame, the mounting frame is capable of being assembled together with the housing.

In at least one example of one aspect of the present disclosure, wherein the first opening end of the housing is to be mated with a lower face of the cable entry system.

In at least one example of one aspect of the present disclosure, wherein the mounting frame has two opposing side frames, and a crossbeam integrally formed or detachably mounted with the two side frames.

In at least one example of one aspect of the present disclosure, wherein an upper portion of at least one of the two side frames have guides for guiding the cable entry system to be assembled with the mounting frame.

In at least one example of one aspect of the present disclosure, wherein each of the two side frames has an upper mounting portion for the installation and fixation of the mounting frame and the cable entry system.

In at least one example of one aspect of the present disclosure, wherein each of the two side frames has a protrusion, and an inner wall of the cavity of the housing has a groove mated with the protrusion.

In at least one example of one aspect of the present disclosure, wherein the adapter connector assembly further comprises: fastener for fixing the mounting frame with the housing.

In at least one example of one aspect of the present disclosure, wherein the fastener comprise screw.

In at least one example of one aspect of the present disclosure, wherein the crossbeam is provided with a fixing hole for matching with a cable fixing device, so as to fix the cables introduced into the cable entry system to the mounting frame.

In at least one example of one aspect of the present disclosure, wherein the cable fixing device is a cable tie or a cable clamp.

In at least one example of one aspect of the present disclosure, wherein a lower portion of the mounting frame is configured to be mated and connected with insert.

In at least one example of one aspect of the present disclosure, wherein the mounting frame has two opposing side frames, and a crossbeam integrally formed or detachably mounted with the two side frames, and each of the two side frames of the mounting frame has lower mounting portions for the installation and fixation of the mounting frame and the inserts.

In another aspect of the present disclosure, an electrical connector plug is provided, wherein the electrical connector plug comprises: a cable entry system for introducing cables; an insert to be electrically connected with the cables; and the adapter connector assembly as described in any of preceding paragraphs, wherein upper and lower portions of a mounting frame of the adapter connector assembly are configured to be assembled with the cable entry system and the inserts, respectively, and a lower portion of a housing of the adapter connector assembly is configured to be assembled with a housing of a mating connector base.

In yet another aspect of the present disclosure, an electrical connector kit is provided, wherein the electrical connector kit comprises the electrical connector plug as described in the preceding paragraph; and a connector base to be mated with the electrical connector plug.

Compared with other options, by using the adapter connector assembly to enable the combined use of a cable entry system and a heavy-duty connector, the present disclosure allows cables to be mounted and connected with the heavy-duty connector in a normal linear state, thereby broadening the scope of cables applicable to heavy-duty connector, and improving a service life of the cables mounted to the heavy-duty connector.

BRIEF DESCRIPTION OF THE DRAWINGS

In order to further clarify the above and other advantages and features of various examples of the present disclosure, reference will be made to the accompanying drawings to present a more specific description of various examples of the present disclosure. It should be understood that these drawings only depict typical examples of the present disclosure and will therefore not be considered a limitation on the protection scope of the present disclosure.

Figure 1:
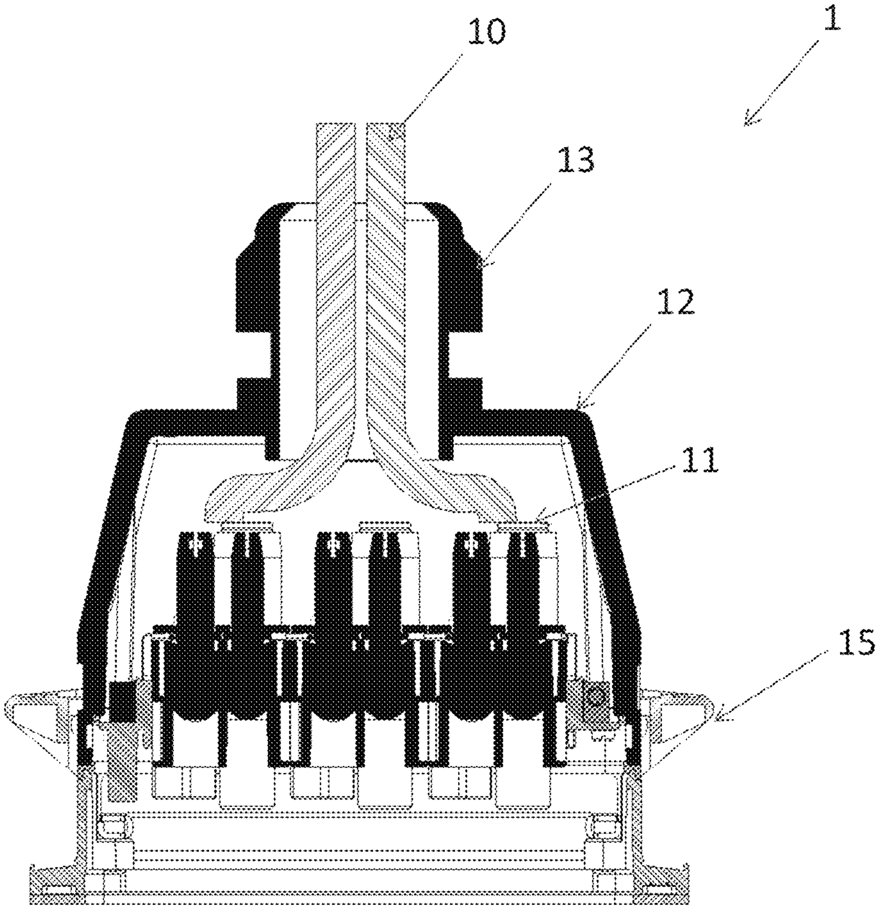
FIG. 1 illustrates a cross-sectional view of a heavy-duty connector with cables mounted.

Some reference numbers:

1 heavy-duty connector
10 cable
11 insert
12 upper shell
13 cable joint
15 lower shell
2 electrical connector
20 adapter connector assembly
21 cable entry system
210 CES fixing screw
211 CES mounting hole
22 mounting frame
221 side frame
222 crossbeam
223 guide
224 upper mounting portion
223 fixing hole
226 protrusion
227 frame mounting hole
228 lower mounting portion
23 insert module
231 insert fixing screw
232 insert mounting hole
24 housing
241 first opening end
242 second opening end
243 cavity
244 housing mounting hole
245 screw
246 washer
25 base housing

DETAILED DESCRIPTION

The present disclosure will be further described below with reference to specific examples and drawings. In the following description, more details are set forth in order to fully understand the present disclosure, but the present disclosure can obviously be implemented in many other ways different from that in the description. Those skilled in the art can make similar promotion and deduction according to the actual applications without violating the connotation of the present disclosure. Therefore, the contents of specific examples herein should not limit the protection scope of the present disclosure.

The present application uses specific words to describe examples of the present application. For example, "one example", "other examples", and/or "some examples" means a certain feature, structure or characteristic associated with at least one example of the present application. Therefore, it should be emphasized and noted that "one example" or "other examples" or "some examples" referred to twice or more in different positions in this specification does not necessarily refer to the same example. Further, certain features, structures or characteristics in one or more examples of the present application may be appropriately combined.

It should be noted that in order to simplify the presentation disclosed in the present application, thereby facilitating the understanding of one or more examples, in the subsequent description for the examples of the present application, sometimes a plurality of features are combined into an example, a drawing or a description thereof. However, this method of disclosure does not mean that the subject matter of the present application requires more features than those mentioned in the claims. In fact, the characteristics of the example are less than the full characteristics of a single example disclosed below.

Figure 2A:
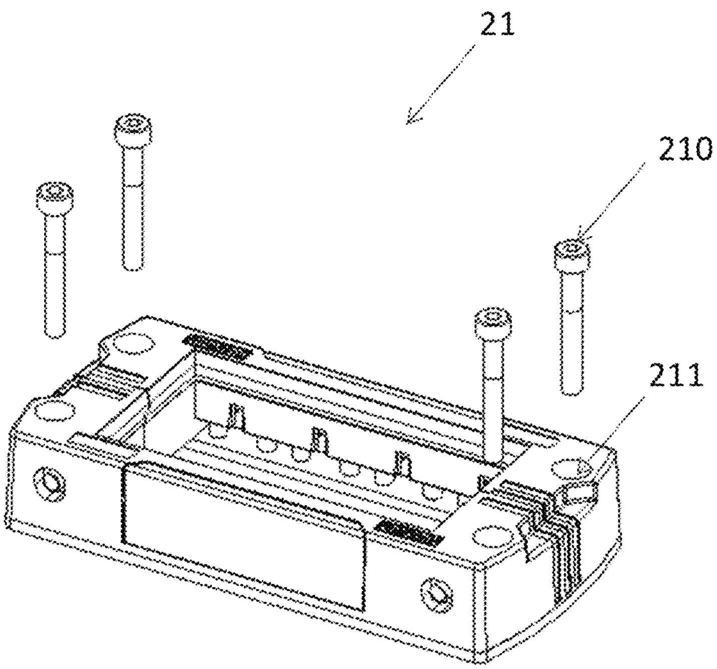
FIG. 2A illustrates a cable entry system.
Figure 2B:
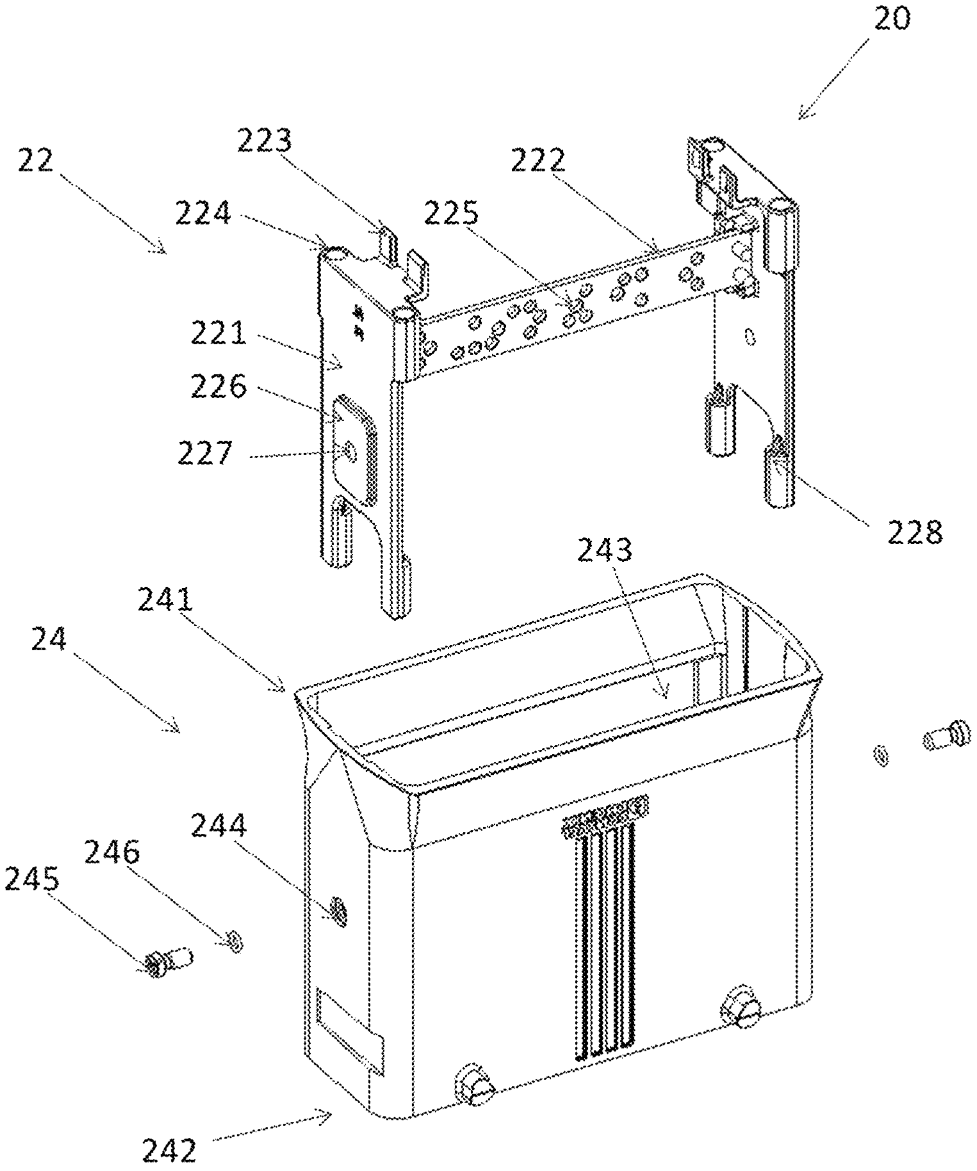
FIG. 2B illustrates an exploded view of an adapter connector assembly for adaptive installation of a cable entry system according to one example of the present disclosure.

With reference to FIGS. 2A and 2B, an adapter connector assembly for adaptive installation of Cable Entry System (CES) according to one example of the present disclosure is described below. FIG. 2A illustrates a cable entry system (hereinafter referred to as CES) 21. FIG. 2B illustrates an exploded view of an adapter connector assembly 20 for adaptive installation of the CES 21 according to one example of the present disclosure.

Referring to FIG. 2A, the CES 21 includes a CES frame, on which CES mounting holes 211 are provided, and is equipped with CES fixing screws 210. Depending on the needs, various forms of cable sleeve assemblies can be mounted in a latched way or otherwise fixed within the CES frame. With the CES fixing screws 210 and CES mounting holes 211, the CES frame of the CES 21 can be fixed to other components, such as to an electrical device, an electrical cabinet, etc., such that cables (not shown) entering into the CES 21 are to be introduced into these components. CES products are sometimes referred to as "through-wall modules" in this field. The CES products can be obtained from PHOENIX CONTACT GMBH & CO. KG with a principal office in Germany.

Referring to FIG. 2B, the adapter connector assembly 20 includes a mounting frame 22, and the mounting frame 22 has two opposing side frames 221 and a crossbeam 222 located between these two side frames 221. In some examples, the crossbeam 222 may be detachably mounted with the two side frames 221, for example, by screws, or by latching. In other examples, the crossbeam 222 may be formed integrally with the two side frames 221 or non-detachably combined with the two side frames 221. An upper portion of the mounting frame 22 may be configured to be assembled with the cable entry system 21. For example, the upper portion of the mounting frame 22 may be configured to be mated with a lower end of the cable entry system 21 as shown in FIG. 2A.

Referring to FIG. 2B, upper portions of the two side frames 221 of the mounting frame 22 has guides 223 for guiding CES 21 to be assembled with the mounting frame 22, so as to prevent a misaligned installation. Although it is illustrated in FIG. 2B that the upper portions of the two side frames 221 each has two guides 223, in other examples, the upper portions of the two side frames 221 or the upper portion of only one side frame 221 may be provided with any suitable number of guides 223. Continuing to refer to FIG. 2B, the upper portions of the two side frames 221 of the mounting frame 22 further comprises upper mounting portions 224 mated with the CES fixing screws 210 and the CES mounting holes 211. The upper mounting portions 224 shown in FIG. 2B are mounting holes for securing and locking the CES 21 to the upper portion of the mounting frame 22 with the CES fixing screws 210. In addition to screw locking, the CES 21 may be fixed to the upper portion of the mounting frame 22 in other ways, for example, a latching way, in which the two side frames 221 of the mounting frame 22 may have protruding portions mating with concave portions on both sides of an upper face of the cable entry system 21, and the cable entry system 21 is secured to the mounting frame 22 by the fitting of the concave portions and the protruding portions.

Referring to FIG. 2B, the crossbeam 222 of the mounting frame 22 may have fixing holes 225 for mating with a cable fixing device to secure the cables introduced into the CES 21 to the mounting frame 22. For example, the cables may be tied to the mounting frame 22 by a cable tie crossing through the fixing holes 225, or the cables may be clamped on the mounting frame 22 by the coordination of a cable clamp and the fixing holes 225. In some examples, according to the cables to be introduced into the CES 21, crossbeam 222 having fixing holes 225 at different positions and/or crossbeam 222 having fixing holes 225 of different number may be replaced, so that a respective cable is secured to the mounting frame 22 by means of fixing hole 225 at a respective position.

Referring to FIG. 2B, the adapter connector assembly 20 further comprises a housing 24. The housing 24 has a first opening end 241 and a second opening end 242 opposite to each other, and a cavity 243 extending between the first opening end 241 and the second opening end 242. The cavity 243 may be used to accommodate at least part of the mounting frame 22. The two frames 221 of the mounting frame 22 both have a protrusion 226, an inner wall of the cavity 243 has grooves (not shown) mated with the protrusions 226, and the grooves are used to accommodate the protrusions 226 on both sides of the mounting frame 22 and allow them to slide within the grooves. In the process of inserting the mounting frame 22 from the first opening end 241 into the cavity 243 of the housing 24, the protrusions 226 on both sides of the mounting frame 22 move in the grooves and towards ends of the grooves, and the movement of the mounting frame 22 within the cavity 243 of the housing 24 is stopped at the ends of the grooves, thereby preventing the mounting frame 22 from moving further down in the cavity 243. In this way, the mounting frame 22 may be stably fixed in the housing 24. Further or alternatively, the mounting frame 22 may further be provided with frame mounting holes 227 on two side frames 221 (e.g., on the protrusions 226 or other positions on the side frames 221). Correspondingly, both sides of the housing 24 also have corresponding housing mounting holes 244. By screwing screws 245 into the frame mounting holes 224 and the housing mounting holes 244, the fixation between the mounting frame 22 and the housing 24 is further enhanced. Further, when screwing the screw 245, a washer 246 may be added to further prevent loosening between the mounting frame 22 and the housing 24. In other examples, the screws 245 may be replaced with other fasteners, as long as the mounting frame 22 and the housing 24 can be further fixed together.

For the upper shell 12 of the exemplary traditional heavy-duty connector 1 as shown in FIG. 1, its opening to be mated with the lower shell 15 of the receptacle portion is larger, while an opening at the other end (top) is significantly reduced, so that the installed cables are bent in the space of the upper shell 12. The first opening end 241 and the second opening end 242 of the housing 24 of the adapter connector assembly 20 as shown in FIG. 2B do not have such a significant difference in apertures, so that the cables do not bend substantially in the cavity 243.

Further referring to FIG. 2B, the upper portion of the housing 24 may be structured similar to a funnel-liked shape. That's to say, an aperture of the upper portion of the housing 24 is gradually increased towards the first opening end 241. The first open end 241 is configured to mate with a lower face of the CES 21, such that when the CES 21 is mounted on the adapter connector assembly 20, the lower face of the CES 21 is engaged with the first open end 241 of the housing 24 of the adapter connector assembly 20. In other examples, the upper portion of the housing 24 may be constructed in other shapes to accommodate at least part of the CES 21. That's to say, when the CES 21 is mounted on the adapter connector assembly 20, at least part of the CES 21 is accommodated in the cavity 243.

Continuing to refer to FIG. 2B, lower portions of the two side frames 221 of the mounting frame 22 may also have lower mounting portions 228 for installation and fixation of the mounting frame 22 and fixed inserts or modular inserts (e.g., an insert module 23 described in FIG. 3 below), e.g., by screws, or by latching.

It is to be understood that the mounting frame 22 shown in FIG. 2B having two opposite side frames and the crossbeam integrally formed or detachably mounted with the two side frames is only exemplary and is not intended to limit the mounting frame. Those skilled in the art may change the configuration of the mounting frame accordingly according to actual needs, as long as at least part of the mounting frame can be accommodated in the housing, and assembled with the housing, and the upper portion of the mounting frame can be assembled with the CES. Further, the lower portion of the mounting frame may be configured to be mated and connected with the fixed or modular inserts.

Figure 3:
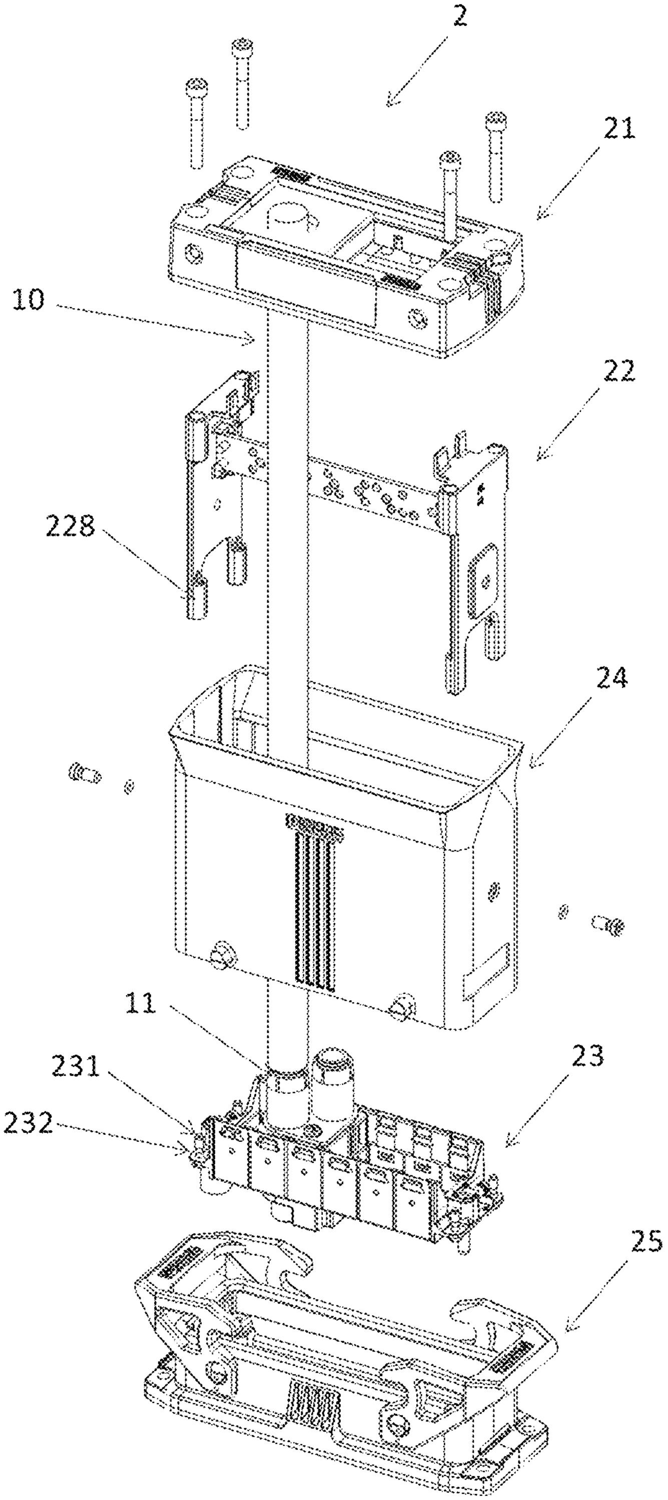
FIG. 3 illustrates an explosive view of an electrical connector being mounted with a cable according to one example of the present disclosure.

FIG. 3 illustrates an explosive view of an electrical connector 2 being mounted with a cable 10 according to one example of the present disclosure. As shown in FIG. 3, the electrical connector 2 includes the CES 21 as described above, the adapter connector assembly 20 including the mounting frame 22 and housing 24, an insert module 23, and a base housing 25. The CES 21, the adapter connector assembly 20 including the mounting frame 22 and housing 24, and the insert module 23 may together form an electrical connector plug. The assembling process of the electrical connector 2 and the cable 10 is substantially as follows. Firstly, the cable 10 is introduced into the CES 21 and electrically connected to an insert 11 in the insert module 23 (e.g., the cable 10 is inserted into the insert 11 and electrically connected to an electrical terminal in the insert 11). The CES 21 is subsequently mounted and fixed to the upper portion of the mounting frame 22, as described above with reference to FIGS. 2A-2B, and the insert module 23 is mounted and fixed to the lower portion of the mounting frame 22, for example, insert fixing screws 231 are screwed into insert mounting holes 232 on the insert module 23 and the lower mounting portions 228 (which are mounting holes) of the mounting frame 22, such that the insert module 23 is fixed and locked to the lower portion of the mounting frame 22. The mounting frame 22 is then placed and fixed to the housing 24. Finally, the housing 24 is fixed with the base housing 25 of the electrical connector 2. The fixation between the lower portion of the housing 24 and the base housing 25 is similar to the fixation between the upper shell (sometimes referred to as HOOD or a free-end housing) and the lower shell (sometimes referred to as HOUSING or a base housing) of the heavy-duty connector, and thus is not described repeatedly herein.

As can be seen from FIG. 3, with the electrical connector 2 of the present disclosure, it is possible to allow the cable 10 to be pre-installed to the electrical connector 2 in a normal linear state, thereby broadening the scope of cables applicable to electrical connector 2 (including bendable cables and non-bendable cables), and improving a service life of the cable 10 mounted to the electrical connector 2.

Although FIG. 3 shows modular inserts, it should be understood that the adapter connector assembly of the present disclosure is also appliable to a connector using fixed inserts.

The adapter connector assembly proposed in the present disclosure is suitable for various connector kits, and these connector kits correspond to various types of connectors, in particular connector plugs.

Preferred implementations of the present disclosure are described in detail above. However, it should be understood that various implementations and variants thereof may be employed without departing from the broad spirit and scope of the present disclosure. Those skilled in the art may make many modifications and changes according to the idea of the present disclosure without creative labor. Accordingly, all technical solutions that can be obtained by logical analysis, reasoning or limited experiments on the basis of the by those skilled in the art according to the idea of the present disclosure shall fall within the protection scope determined by the claims of the present disclosure.

Terms and expressions used herein are used as descriptive terms and expressions rather than restrictive terms and expressions, and are not intended to exclude any equivalence of the features (or some parts thereof) shown and described in the use of such terms and expressions. It should be recognized that various modifications within the scope of the claims are possible. Accordingly, the claims are intended to cover all such equivalents.

The invention claimed is:

1. An adapter connector assembly, wherein one end of the adapter connector assembly is configured for adaptive installation of a cable entry system, and wherein the adapter connector assembly comprises:

a mounting frame, wherein an upper portion of the mounting frame is configured to be assembled with the cable entry system; and a housing comprising a first opening end and a second opening end opposite each other, and a cavity extending between the first opening end and the second opening end, the cavity being configured to accommodate at least part of the mounting frame, wherein the mounting frame is configured to be assembled together with the housing, wherein, the mounting frame comprises two opposing side frames and a crossbeam that is one of: integrally formed with the two side frames or detachably mounted with the two side frames, and wherein an upper portion of at least one side frame of the two side frames comprises guides configured to guide the cable entry system to be assembled with the mounting frame.

2. The adapter connector assembly according to claim 1, wherein the first opening end of the housing is configured to be mated with a lower face of the cable entry system.

3. The adapter connector assembly according to claim 1, wherein each of the two side frames comprises an upper mounting portion configured for installation and fixation of the mounting frame and the cable entry system.

4. The adapter connector assembly according to claim 1, wherein each of the two side frames comprise a protrusion, and wherein an inner wall of the cavity of the housing has a groove mated with the protrusion.

5. The adapter connector assembly according to claim 1, wherein the adapter connector assembly further comprises:

a fastener configured to fix the mounting frame with the housing.

6. The adapter connector assembly according to claim 5, wherein the fastener comprises a screw.

7. The adapter connector assembly according to claim 1, wherein the crossbeam defines a fixing hole configured to match with a cable fixing device, and wherein the cable fixing device is configured to fix a cable introduced into the cable entry system to the mounting frame.

8. The adapter connector assembly according to claim 7, wherein the cable fixing device is one of a cable tie or a cable clamp.

9. The adapter connector assembly according to claim 1, wherein a lower portion of the mounting frame is configured to be mated and connected with an insert.

10. The adapter connector assembly according to claim 9, wherein, each of the two side frames of the mounting frame comprises lower mounting portions configured for installation and fixation of the mounting frame and the insert.

11. An electrical connector plug comprising:

a cable entry system configured to introduce cables;

an insert configured to be electrically connected with the cables; and an adapter connector assembly comprising:

a mounting frame, wherein an upper portion of the mounting frame is configured to be assembled with the cable entry system; and a housing comprising a first opening end and a second opening end opposite each other, and a cavity extending between the first opening end and the second opening end, the cavity being configured to accommodate at least part of the mounting frame, wherein the mounting frame is configured to be assembled together with the housing, wherein the mounting frame comprises two opposing side frames and a crossbeam that is one of: integrally formed with the two side frames or detachably mounted with the two side frames, wherein an upper portion of at least one side frame of the two side frames comprises guides configured to guide the cable entry system to be assembled with the mounting frame, wherein upper and lower portions of the mounting frame of the adapter connector assembly are configured to be assembled with the cable entry system and the insert, respectively, and wherein a lower portion of the housing of the adapter connector assembly is configured to be assembled with a housing of a mating connector base.

12. An electrical connector kit comprising:

the electrical connector plug comprising:

a cable entry system configured to introduce cables;

an insert configured to be electrically connected with the cables; and an adapter connector assembly comprising:

a mounting frame, wherein an upper portion of the mounting frame is configured to be assembled with the cable entry system; and a housing comprising a first opening end and a second opening end opposite each other, and a cavity extending between the first opening end and the second opening end, the cavity being configured to accommodate at least part of the mounting frame, wherein the mounting frame is configured to be assembled together with the housing, wherein the mounting frame comprises two opposing side frames and a crossbeam that is one of: integrally formed with the two side frames or detachably mounted with the two side frames, wherein an upper portion of at least one side frame of the two side frames comprises guides configured to guide the cable entry system to be assembled with the mounting frame, wherein upper and lower portions of the mounting frame of the adapter connector assembly are configured to be assembled with the cable entry system and the insert, respectively, and wherein a lower portion of the housing of the adapter connector assembly is configured to be assembled with a housing of a mating connector base; and a connector base configured to be mated with the electrical connector plug.

* * * * *